United States Patent
Sundararaman et al.

(10) Patent No.: US 11,706,105 B2
(45) Date of Patent: Jul. 18, 2023

(54) SELECTING LOW PRIORITY PODS FOR GUARANTEED RUNS

(71) Applicant: International Business Machines Corporation, Armonk, NY (US)

(72) Inventors: Renganathan Sundararaman, Cary, NC (US); Krishnan Venkitasubramanian, Bengaluru (IN); Sundaragopal Venkatraman, Chennai (IN); Ramakrishna Alavala, Podili (IN); Gayatri Renganathan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/644,105

(22) Filed: Dec. 14, 2021

(65) Prior Publication Data

US 2023/0188433 A1 Jun. 15, 2023

(51) Int. Cl.
*H04L 41/5022* (2022.01)
*H04L 41/16* (2022.01)
*H04L 67/1023* (2022.01)

(52) U.S. Cl.
CPC .......... *H04L 41/5022* (2013.01); *H04L 41/16* (2013.01); *H04L 67/1023* (2013.01)

(58) Field of Classification Search
CPC .. H04L 41/5022; H04L 41/16; H04L 67/1023
See application file for complete search history.

(56) References Cited

U.S. PATENT DOCUMENTS

| 10,545,796 B2 | 1/2020 | Bahramshahry et al. |
| 10,871,998 B2 | 12/2020 | Parees et al. |
| 11,281,492 B1 * | 3/2022 | Rebeja .................. G06F 9/5077 |

(Continued)

FOREIGN PATENT DOCUMENTS

| CN | 109960585 A | 7/2019 |
| CN | 112799837 A | 5/2021 |

OTHER PUBLICATIONS

Kubernetes, "Node-Pressure Eviction", Jun. 2021, Kubernetes.io. "https://kubernetes.io/docs/concepts/scheduling-eviction/node-pressure-eviction/" (Year: 2021).*

(Continued)

*Primary Examiner* — Hitesh Patel
*Assistant Examiner* — Eui H Kim
(74) *Attorney, Agent, or Firm* — Yee & Associates, P.C.

(57) ABSTRACT

Service assurance is provided. A low priority pod corresponding to a low priority service in an orchestration platform that is to be evicted due to a predicted peak load period of a high priority service is identified based on analysis of historical and resource information. The low priority service corresponding to the low priority pod that is to be evicted due to the predicted peak load period of the high priority service is marked as an assured service for a guaranteed run in response to receiving an input from a user who was notified regarding eviction of the low priority pod. The low priority pod corresponding to the low priority service that is to be evicted due to the predicted peak load period of the high priority service is provisioned on a second host node prior to the eviction of the low priority pod from a first host node.

18 Claims, 6 Drawing Sheets

(56) References Cited

U.S. PATENT DOCUMENTS

| | | | |
|---|---|---|---|
| 2013/0067089 A1 | 3/2013 | Synytskyy et al. | |
| 2015/0295792 A1* | 10/2015 | Cropper | H04L 67/10 709/226 |
| 2017/0109212 A1* | 4/2017 | Gaurav | G06F 9/5077 |
| 2017/0371696 A1* | 12/2017 | Prziborowski | G06F 9/45558 |
| 2018/0321971 A1 | 11/2018 | Bahramshahry et al. | |
| 2020/0151018 A1* | 5/2020 | Jha | G06F 9/4856 |
| 2020/0236160 A1 | 7/2020 | Moscibroda et al. | |
| 2021/0084103 A1* | 3/2021 | Smith | G06F 11/1479 |
| 2021/0184942 A1* | 6/2021 | Tootaghaj | H04L 41/16 |

OTHER PUBLICATIONS

Kuber_Evict, "Pod Priority and Preemption _ Kubernetes", Jun. 2021, Kubernetes.io "https://kubernetes.io/docs/concepts/scheduling-eviction/pod-priority-preemption/" (Year: 2021).*

Kuebr_Crit, "Guaranteed Scheduling For Critical Add-On Pods" 2018, Kubernetes.io "https://kubernetes.io/docs/tasks/administer-cluster/guaranteed-scheduling-critical-addon-pods/" (Year: 2018).*

Matterson, Nate, "How to Export, Monitor, and Alert on Kubernetes Events" ContainIQ Sep. 2021 "https://www.containiq.com/post/export-monitor-and-alert-on-kubernetes-events" (Year: 2021).*

Cavdar et al., "Reducing Execution Waste in Priority Scheduling: a Hybrid Approach," 2016 USENIX Workshop on Cool Topics in Sustainable Data Centers (CoolDC '16), Santa Clara, CA, Mar. 19, 2016, 6 pages. https://www.usenix.org/conference/cooldc16/workshop-program/presentation/cavdar.

* cited by examiner

SELECTING LOW PRIORITY PODS FOR GUARANTEED RUNS

BACKGROUND

1. Field

The disclosure relates generally to orchestration platforms and more specifically to selecting low priority pods corresponding to low priority workload deployments for guaranteed runs in an orchestration platform during peak load periods of high priority workload deployments.

2. Description of the Related Art

An orchestration platform, such as, for example, Kubernetes® (a registered trademark of the Linux Foundation of San Francisco, Calif.), provides an architecture for automating deployment, scaling, and operations of pods, each pod comprising one or more containers, for running workload deployments across clusters of host nodes. Many cloud services offer an orchestration platform as a service (e.g., Platform-as-a-Service, Infrastructure-as-a-Service, or the like).

SUMMARY

According to one illustrative embodiment, a computer-implemented method for service assurance is provided. A computer identifies a low priority pod corresponding to a low priority service in an orchestration platform that is to be evicted due to a predicted peak load period of a high priority service based on analysis of historical and resource information. The computer marks the low priority service corresponding to the low priority pod that is to be evicted due to the predicted peak load period of the high priority service as an assured service for a guaranteed run in response to receiving an input from a user who was notified regarding eviction of the low priority pod. The computer provisions the low priority pod corresponding to the low priority service that is to be evicted due to the predicted peak load period of the high priority service on a second host node prior to the eviction of the low priority pod from a first host node. According to other illustrative embodiments, a computer system and computer program product for service assurance are provided.

DETAILED DESCRIPTION

Figure 1:
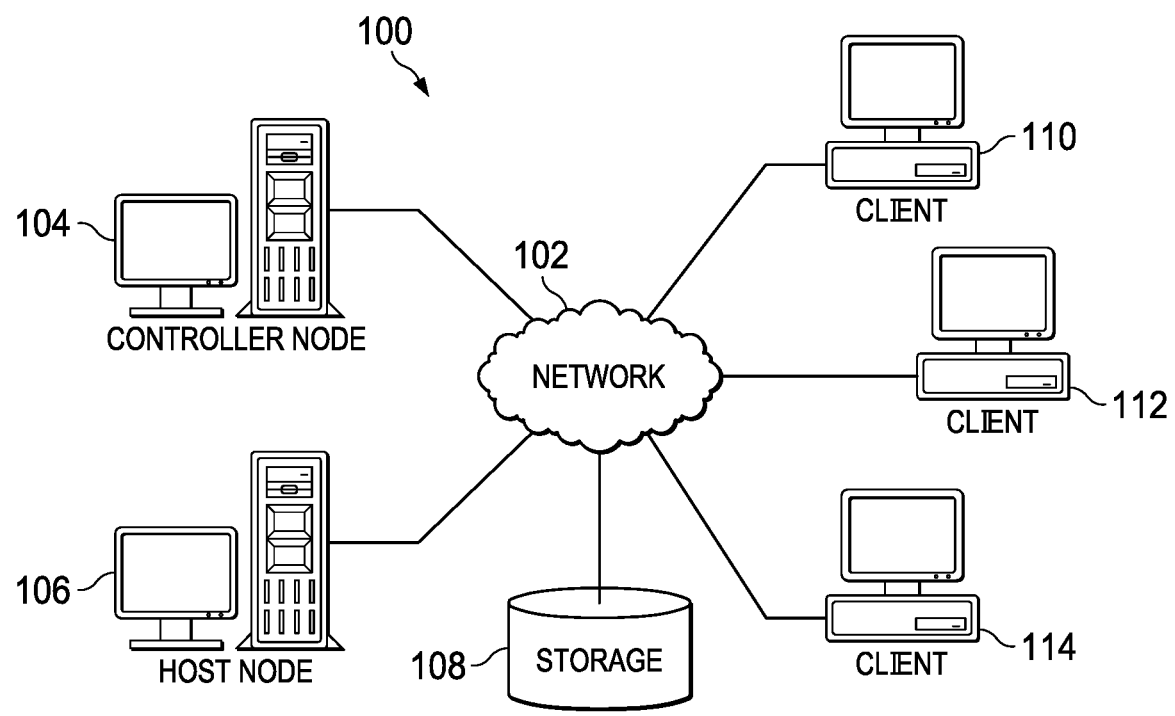
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
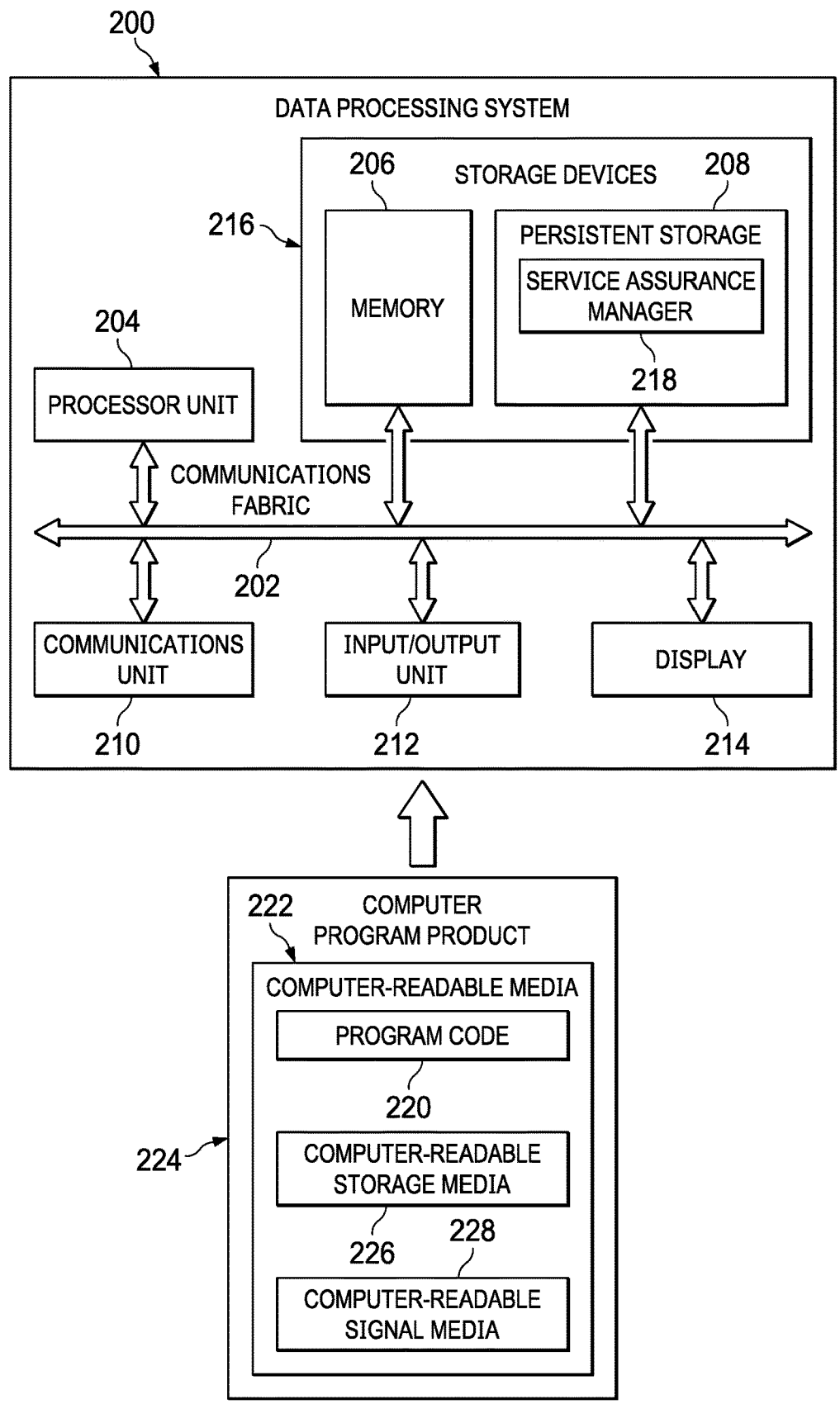
FIG. 2 is a diagram of a data processing system in which illustrative embodiments may be implemented.
Figure 3:
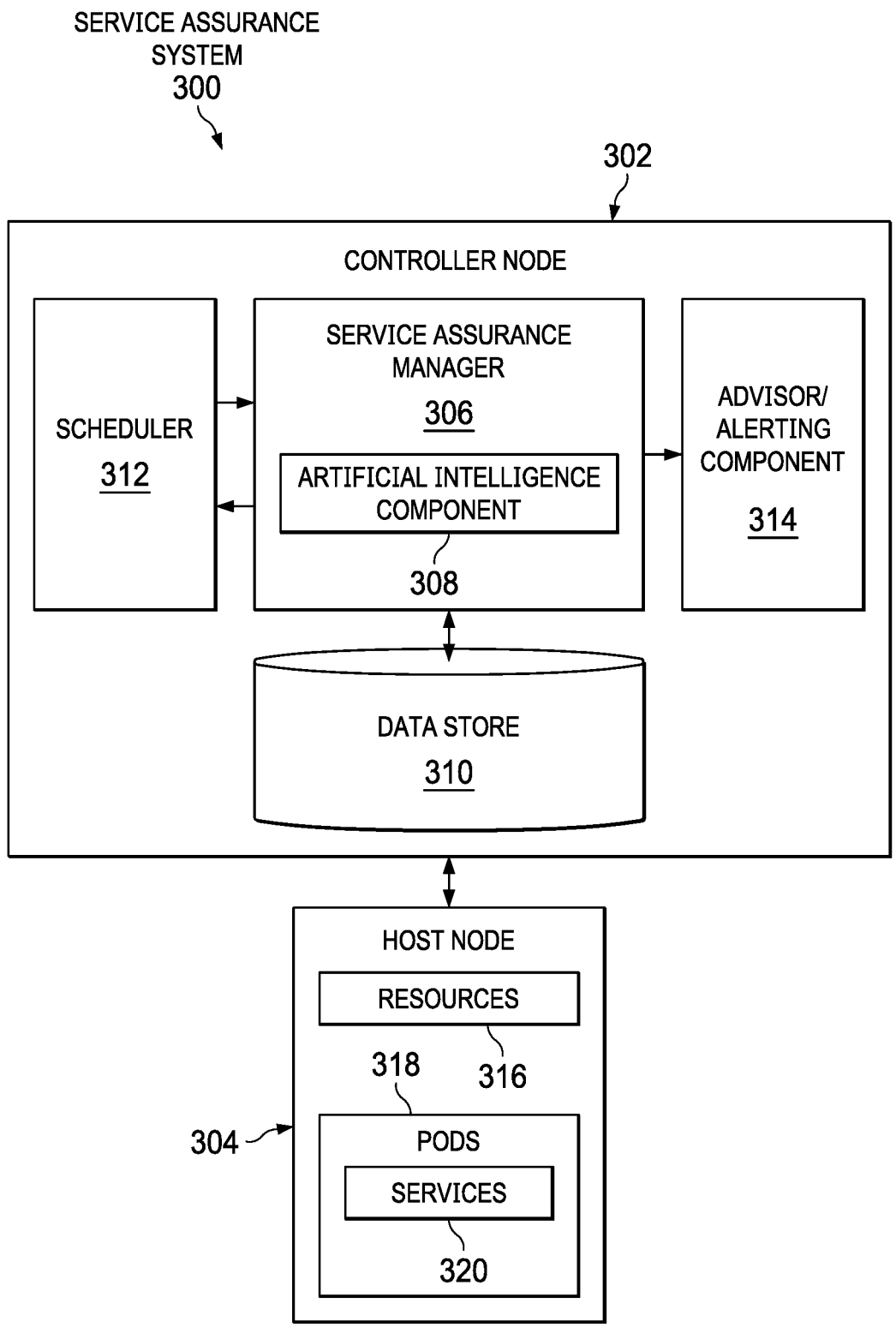
FIG. 3 is a diagram illustrating an example of a service assurance system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In this example, network data processing system 100 represents an orchestration platform, which is a part of a hybrid multi-cloud environment.

The orchestration platform may be, for example, a Kubernetes platform, architecture, environment, or the like. However, it should be understood that Kubernetes is meant as an example architecture only and not as a limitation on illustrative embodiments. The orchestration platform provides automatic deployment, scaling, and operations of pods for running workloads across clusters of host nodes (also known as worker nodes, compute nodes, or minions) within the hybrid multi-cloud environment. While the term pod is generally used in the Kubernetes paradigm, the term as used herein is not limited to that environment but rather refers to any grouping of one or more containers where workloads are deployed and hold the running applications, libraries, and their dependencies.

The hybrid multi-cloud environment is a combination of a plurality of different types of cloud environments, such as, for example, public clouds, private clouds, community clouds, and the like, managed by different entities (e.g., cloud providers). Each cloud environment is comprised of a cluster of host nodes for running pods corresponding to different services. Services may include, for example, banking services, financial services, healthcare services, educational services, governmental services, entertainment services, insurance services, data services, transactional services, and the like. Services may also include high priority services and low priority services. High priority services take precedence over low priority services based on limited resource availability, especially during peak load periods of high priority services. As a result, low priority services may be evicted during these peak load periods.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, controller node 104 and host node 106 connect to network 102, along with storage 108. Controller node 104 and host node 106 may be, for example, server computers with high-speed connections to network 102.

Controller node 104 represents a number of controller nodes comprising a control plane of the hybrid multi-cloud environment. Controller node 104 is a main controlling unit for managing workload deployments (e.g., services) and directing communication across clusters of host nodes. Host node 106 represents clusters of host nodes in the hybrid multi-cloud environment. Host node 106 is a machine where controller node 104 deploys pods for running the workloads. While the terms controller node and host node are generally used in the Kubernetes paradigm, these terms as used herein are not limited to that environment but rather refer to any type of nodes that are capable of controlling and running workloads.

Moreover, controller node 104 identifies a set of low priority pods, which correspond to a set of low priority workloads, that is to be evicted from a set of host nodes in the orchestration platform during peak load periods of high priority workloads based on analysis of historic information and resource information corresponding to the orchestration platform. The historic information and the resource information can include, for example, total number of running pods in the orchestration platform; priority set for each respective pod running in the orchestration platform; number of host nodes used to run the pods within a cluster running multiple workloads; pod utilization metrics including current and historic maximum, minimum, and average pod utilization metrics; host node utilization metrics including current and historic maximum, minimum, and average host node utilization metrics; history of high priority pod scaling with corresponding time periods; history of low priority pod evictions during peak load periods of high priority workloads; host node specifications that include information regarding processor, memory, storage, operating system version, and the like; identified patterns of peak load periods for each respective high priority workload; workload deployment dates and times on respective pods; growth rate of pods and resource utilization during peak load periods; and the like. In addition, controller node 104 selects the set of low priority pods for guaranteed runs in the orchestration platform during the peak load periods of high priority workloads based on receiving an input from a user (e.g., program developer, system administrator, security analyst, or the like) who marked the set of low priority services corresponding to the set of low priority pods as assured for availability services. Further, controller node 104 provisions the set of low priority pods corresponding to the set of low priority services, which the user marked as assured for availability services, on a set of different host nodes prior to the eviction of the set of low priority pods for guaranteed runs. The set of different host nodes may include, for example, a same or similar host node in the same cluster, a heterogeneous host node in the same cluster that can run a reduced sized low priority pod, a host node in a different cloud environment of the hybrid multi-cloud environment, or the like.

Client 110, client 112, and client 114 also connect to network 102. Clients 110, 112, and 114 are clients of controller node 104 and host node 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 to request the services that controller node 104 deployed on the clusters of host nodes represented by host node 106. A client device user may also utilize a client device to mark a low priority service as an assured for availability service upon notification that the low priority service may be affected by the eviction of a corresponding low priority pod during the peak load period of high priority services so that the low priority pod corresponding to the low priority service is guaranteed a run, albeit on a different host node.

Storage 108 is a network storage device capable of storing any type of data in a structured format or an unstructured format. In addition, storage 108 may represent a plurality of network storage devices. Further, storage 108 may store identifiers and network addresses for a plurality of host nodes, identifiers for a plurality of different cloud environments in the hybrid multi-cloud environment, identifiers and network addresses for a plurality of client devices, identifiers for a plurality of client device users, historical information corresponding to the orchestration platform, resource information corresponding to the orchestration platform, and the like. Furthermore, storage 108 may store other types of data, such as authentication or credential data that may include usernames, passwords, and the like associated with, for example, program developers, system administrators, security analysts, client device users, and the like.

In addition, it should be noted that network data processing system 100 may include any number of additional nodes, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on controller node 104 and downloaded to host node 106 over network 102 for use on host node 106.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as controller node 104 in FIG. 1, in which computer-readable program code or instructions implementing the service assurance processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores service assurance manager 218. However, it should be noted that even though service assurance manager 218 is illustrated as residing in persistent storage 208, in an alternative illustrative embodiment, service assurance manager 218 may be a separate component of data processing system 200. For example, service assurance manager 218 may be a hardware component coupled to communication fabric 202 or a combination of hardware and software components. In another alternative illustrative embodiment, a first set of components of service assurance manager 218 may be located in data processing system 200 and a second set of components of service assurance manager 218 may be located in a second data processing system, such as, for example, a second controller node.

Service assurance manager 218 controls the process of identifying a set of low priority pods, which correspond to a set of low priority workload deployments (e.g., services), that is to be evicted from a set of host nodes in an orchestration platform during peak load periods of high priority workload deployments based on analysis of historic information and resource information corresponding to the orchestration platform. Service assurance manager 218 selects the set of low priority pods for guaranteed runs in the orchestration platform during the peak load periods of high priority workload deployments based on receiving an input from a user marking the set of low priority service deployments corresponding to the set of low priority pods as assured services. Furthermore, service assurance manager 218 provisions the set of low priority pods corresponding to the set of low priority services marked as assured services on a set of different host nodes in the orchestration platform prior to eviction for guaranteed runs.

As a result, data processing system 200 operates as a special purpose computer system in which service assurance manager 218 in data processing system 200 enables the selecting and provisioning of low priority pods for guaranteed runs during peak load periods of high priority service deployments in the orchestration platform. In particular, service assurance manager 218 transforms data processing system 200 into a special purpose computer system as compared to currently available general computer systems that do not have service assurance manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

To support peak load periods or conditions corresponding to high priority workload deployments, which include services, applications, and the like, an orchestration platform (e.g., Kubernetes) evicts low priority pods and scales up the number of high priority pods corresponding to the high priority workload deployments. This eviction of low priority pods often results in disruption of corresponding low priority services. However, even though some of these low priority services may not be core to an entity, such as, for example, an enterprise, business, company, organization, institution, agency, or the like, certain low priority services can perform a needed function, such as, for example, a security gate pass generating application. Low priority service availability is at risk during peak load periods of high priority workload deployments due to eviction of these lower priority pods.

Users, such as, for example, developers, operators, administrators, and the like, of the orchestration platform will continue to provision new workloads corresponding to services and a scheduler of the orchestration platform will allow the new workload deployments depending on the priority set for each respective workload. Currently, the orchestration platform scheduler does not check for any type of scheduling pattern, such as, for example, how many pods and host nodes were previously used for a workload deployment, whether any pattern exists for the scaling up of high priority pods and eviction of low priority pods, and the like.

In a multitenant orchestration platform, obtaining peak load utilization patterns for resource availability and capturing historical information, such as, for example, number of nodes scaled, pod metrics, host node metrics, host node specifications, and the like, can provide a view of additional deployments for any new or existing high priority workloads and any low priority pod evictions that will occur due to the high priority workload deployments. The availability of low priority workload deployments (e.g., low priority services) is at risk during these peak load periods of high priority workload deployments due to these low priority pod evictions in the multitenant orchestration platform. Downtimes of low priority workload deployments due to low priority pod evictions, can cause certain needed services to be rendered unavailable, which can create user dissatisfaction issues and service level agreement violations.

Illustrative embodiments provide control of the low priority pod eviction process. For example, illustrative embodiments, using a combination of historical information and resource specification information, are able to analyze low priority pods that may be evicted during the peak load periods of the high priority workload deployments. In addition, illustrative embodiments enable users to make informed decisions regarding which low priority pods corresponding to low priority services will be guaranteed to run during the peak load periods. Illustrative embodiments can guarantee a replicated eviction (e.g., replicate a low priority pod that is to be evicted on a different host node within the orchestration platform). Alternatively, illustrative embodiments can run the low priority workload on a host node in a different cloud environment within a hybrid multi-cloud environment.

Illustrative embodiments utilize an artificial intelligence component to capture various types of information to analyze workloads and identify workload patterns for understanding low priority pod evictions and to control the process of the low priority pod evictions to enable assured availability of certain low priority services. The artificial intelligence component utilizes a data store to store the various types of information, which can include, for example: number of running pods in the orchestration platform; priority of each respective running pod; number of host nodes used to run the pods within a cluster with multiple workloads; pod utilization metrics that include current and historic maximum, minimum, and average pod utilization metrics; host node utilization metrics that include current and historic maximum, minimum, and average host node utilization metrics; high priority pod scaling up history and corresponding timelines; low priority pod eviction history during peak load periods; host node specification information that includes, for example, processor, memory, storage, operating system version, and the like; peak load pattern for each respective high priority workload deployment; workload deployment dates and times for respective pods; growth rate of pods and resource utilization during peak load periods; and the like.

The artificial intelligence component captures the history of peak load utilization metrics for all pods in the orchestration platform and captures the growth rate in the number of running pods and resource utilization during the peak load conditions. Based on the captured information, the artificial intelligence component is able to predict an upcoming peak load period and estimate the resources needed for all running pods during the predicted upcoming peak load period. In addition, based on order of priority, quality of service (e.g., service level agreement response time), and date of workload deployment, the artificial intelligence component can identify a list of pods that will be scaled up or evicted.

After the artificial intelligence component analyses the captured information, the artificial intelligence component identifies all potential candidates for low priority pod evictions and then compiles a list of low priority services that will be disrupted or degraded during the peak load periods for high priority services, such as, for example, a banking application that typically has peak load at month end. When illustrative embodiments determine that a low priority pod eviction is to be performed due to peak load conditions of high priority workload deployments, illustrative embodiments perform one of a plurality of different alternatives based on different determinations.

For a guaranteed low priority pod run, illustrative embodiments inform users in advance of potential low priority service downtimes. Thus, illustrative embodiments, by informing a user in advance of a potential low priority service downtime, enable the user to mark a low priority service as an "assured for availability service" if desired by the user. If the user marks a low priority service as an assured for availability service, then illustrative embodiments instruct the orchestration platform scheduler not to evict the low priority pod corresponding to that service during peak load periods of high priority workload deployments.

For a guaranteed replicated low priority pod eviction, illustrative embodiments search for a different host node to run the low priority pod, and check host node affinity as well based on, for example, pod specifications indicating that a given pod needs to run on a host node having a certain configuration, that the pod needs to run in a certain geographic region, that the pod needs to run using the same database for low latency, or the like. Illustrative embodiments provision (e.g., deploy and run) the low priority pod on the secondary host node prior to illustrative embodiments instructing the scheduler to evict (e.g., terminate) the low priority pod on the current host node.

For a guaranteed low priority pod run by optimizing resources, illustrative embodiments determine which option is best to keep a low priority service available that corresponds to a low priority pod that is to be evicted. One option is for illustrative embodiments to search for the availability of a different host node (e.g., same or similar type of host node in the same cluster) to run the low priority pod. Another option is for illustrative embodiments to determine whether the low priority pod can be resized, while still maintaining service level agreement requirements albeit with a reduced size or footprint. A further option is for illustrative embodiments to search for the availability of a heterogeneous host node (e.g., a different type of system such as system X versus system P) that can guarantee the run of the low priority pod with reduced size. A further option is for illustrative embodiments to determine whether the low priority pod can run on a host node in another cloud within a hybrid multi-cloud environment. If illustrative embodiments are able to find a host node that meets one of the above conditions, then illustrative embodiments perform the guaranteed replicated eviction of the low priority pod. If illustrative embodiments are not able to find a host node that meets one of the above conditions, then illustrative embodiments perform the guaranteed low priority pod run in response to the user marking the service as an assured for availability service.

An example algorithm that illustrative embodiments can utilize to identify affected low priority services is as follows. For each peak load period of high priority workload deployments, illustrative embodiments estimate the workload capacity using, for example: Number of pods needed for each specific workload deployment (P); Number of processors (CPU) of host nodes (N)=CPU(N1)+CPU(Nn); Total number of CPUs=Sum(CPU(Nn)); Total CPU capacity needed for each specific workload deployment=Sum(CPU (P)); and Total memory capacity (MEM) needed for each specific workload deployment=Sum(MEM(P)).

Illustrative embodiments identify a list of candidate low priority pods that may be evicted based on total CPU capacity using, for example: List of potential services (S1, S2, . . . Sn) that may be affected by pod eviction=Sn; Number of pods for each specific service (e.g., workload deployment) in Sn=PP(Sn); List of probable low priority pods for eviction=PE; List of probable low priority pods for eviction in each specific service in Sn=PE(Sn); List of services unavailable (starting at null)=SU; and List of services degraded (starting at null)=SD.

When the total CPU capacity, Sum(CPU(P)), needed for a list of services is greater than available CPU capacity, illustrative embodiments identify the probable low priority pods for eviction for each specific service=PE(Sn). For example, if (PP(Sn)−PE(Sn) =0, then service is unavailable and SU is updated with that service; Else, service is degraded and SD is updated with that service; Done.

Illustrative embodiments also identify a list of candidate low priority pods that will be evicted based on total memory capacity (MEM) using, for example: List of potential services (S1, S2, . . . Sn) that may be affected by pod eviction=Sn; Number of pods for each specific service (e.g., workload deployment) in Sn=PP(Sn); List of probable low priority pods for eviction=PE; List of probable low priority pods for eviction in each specific service in Sn=PE(Sn); List of services unavailable (starting at null)=SU; and List of services degraded (starting at null)=SD.

When the total memory capacity, Sum(MEM(P)), needed for a list of services is greater than available memory capacity, illustrative embodiments identify the probable low priority pods for eviction for each specific service=PE(Sn). For example, if (PP(Sn)−PE(Sn)=0, then service is unavailable and SU is updated with that service; Else, service is degraded and SD is updated with that service; Done. As a result, the SU and SD now contain a list of services that are expected to have service downtime or service degradation for the duration of that particular peak load period based on total CPU capacity and total memory capacity.

Thus, illustrative embodiments provide one or more technical solutions that overcome a technical problem with running low priority pods corresponding to needed low priority services in an orchestration platform during peak load periods. As a result, these one or more technical solutions provide a technical effect and practical application in the field of orchestration platforms.

With reference now to FIG. 3, a diagram illustrating an example of a service assurance system is depicted in accordance with an illustrative embodiment. Service assurance system 300 may be implemented in, for example, an orchestration platform such as network data processing system 100 in FIG. 1. Service assurance system 300 is a system of hardware and software components for selecting low priority pods corresponding to low priority workload deployments for guaranteed runs during peak load periods of high priority workload deployments.

In this example, service assurance system 300 includes controller node 302 and host node 304, such as, for example, controller node 104 and host node 106 in FIG. 1. However, it should be noted that service assurance system 300 is intended as an example only and not as a limitation on illustrative embodiments. In other words, service assurance system 300 can include any number of controller nodes, host nodes, and other components not shown.

Controller node 302 includes service assurance manager 306, artificial intelligence component 308, data store 310, scheduler 312, and advisor/alerting component 314. Service assurance manager 306 may be, for example, service assurance manager 218 in FIG. 2. Service assurance manager 306 controls the process of selecting low priority pods corresponding to low priority workload deployments for guaranteed runs in the orchestration platform during peak load periods of high priority workload deployments.

Service assurance manager 306 includes artificial intelligence component 308. Artificial intelligence component 308 has intelligent behavior and can be based on the function of the human brain. Artificial intelligence component 308 comprises at least one of an artificial neural network, cognitive system, Bayesian network, fuzzy logic, expert system, natural language system, or some other suitable system. Machine learning can be used to train artificial intelligence component 308. Machine learning involves inputting data to the process and allowing the process to adjust and improve the function of artificial intelligence component 308, thereby increasing the predictive accuracy of artificial intelligence component 308 and, thus, increasing the performance of service assurance manager 306 in controller node 302.

A machine learning model of artificial intelligence component 308 can learn without being explicitly programmed to do so. The machine learning model can learn based on training data input into the machine learning model. The machine learning model can learn using various types of machine learning algorithms. The machine learning algorithms include at least one of supervised learning, unsupervised learning, feature learning, sparse dictionary learning, anomaly detection, association rules, or other types of learning algorithms. Examples of machine learning models include an artificial neural network, a decision tree, a support vector machine, a Bayesian network, a genetic algorithm, and other types of models. These machine learning models can be trained using, for example, historical workload and resource information stored in data store 310.

Data store 310 contains, for example: total number of pods running in the orchestration platform; priority set for each respective pod running in the orchestration platform; number of host nodes used to run the pods; historic maximum, minimum, and average pod utilization metrics; current maximum, minimum, and average pod utilization metrics; historic maximum, minimum, and average host node utilization metrics; current maximum, minimum, and average host node utilization metrics; history of scaling up high priority pod with corresponding peak load periods of high priority workloads; history of evicting low priority pods during peak load periods of high priority workloads; specifications of host nodes that include information regarding processor, memory, storage, operating system version, and the like; identified patterns of peak load periods for each respective high priority workload; workload deployment dates and times on respective pods; growth rate of pods and resource utilization during peak load periods; and the like. Data store 310 also contains configuration data of a set of clusters of host nodes corresponding to controller node 302, representing the overall and desired state of the clusters at any given time.

Scheduler 312 selects which host node an unscheduled pod runs on, based on resource availability of respective host nodes. A pod is a basic unit managed by scheduler 312. Scheduler 312 tracks resource utilization on each host node to ensure that workload is not scheduled in excess of available resources.

Service assurance manager 306 utilizes advisor/alerting component 314 to advise or alert a user, such as, for example, a program developer, operator, system administrator, security analyst, or the like, that a low priority pod corresponding to a low priority workload deployment is to be evicted during a predicted peak load period corresponding to a high priority workload deployment in the orchestration platform. Advisor/alerting component 314 enables the user to make an informed decision as to whether to mark the low priority workload deployment (e.g., service), which corresponds to the low priority pod that is to be evicted, as an assured for availability service. An assured for availability service means that the service is guaranteed a run with available resources in the orchestration platform.

Host node 304 represents the set of clusters of host nodes managed by controller node 302. Host node 304 includes resources 316. Resources 316 may include, for example, a set of processors, a set of memory, a set of storage, a set of network devices, a set of operating systems, and the like. Host node 304 utilizes resources 316 to run pods 318, which correspond to services 320. Pods 318 represent a plurality of pods and services 320 represent a plurality of services. For example, pods 318 include a set of high priority pods corresponding to high priority workload deployments (e.g., high priority services of services 320) and a set of low priority pods corresponding to low priority workload deployments (e.g., low priority services of services 320).

Service assurance manager 306 utilizes artificial intelligence component 308 to predict a peak load period of high priority services of services 320 based on information contained in data store 310. In addition, service assurance manager 306 utilizes artificial intelligence component 308 to estimate a total number of resources 316 needed for services 320 during the predicted peak load period of the high priority services. Further, service assurance manager 306 utilizes artificial intelligence component 308 to identify a set of low priority pods of pods 318 that needs to be evicted in response to artificial intelligence component 308 determining that the estimated total number of resources needed for services 320 during the predicted peak load period of the high priority services is greater than the total number of available resources.

Based on the information provided by artificial intelligence component 308, service assurance manager 306 utilizes advisor/alerting component 314 to proactively inform the user in advance that the set of low priority pods are to be evicted. As a result, if desired, the user can mark one or more of the low priority services, which correspond to the set of low priority pods to be evicted, as assured services for guaranteed runs during the predicted peak load period. Upon receiving an indication of one or more of the low priority services, which correspond to the set of low priority pods to be evicted, being marked as assured services by the user, service assurance manager 306 selects those low priority pods corresponding to the marked low priority services for guaranteed runs in the orchestration platform during peak load periods of high priority workload deployments.

Figure 4A:
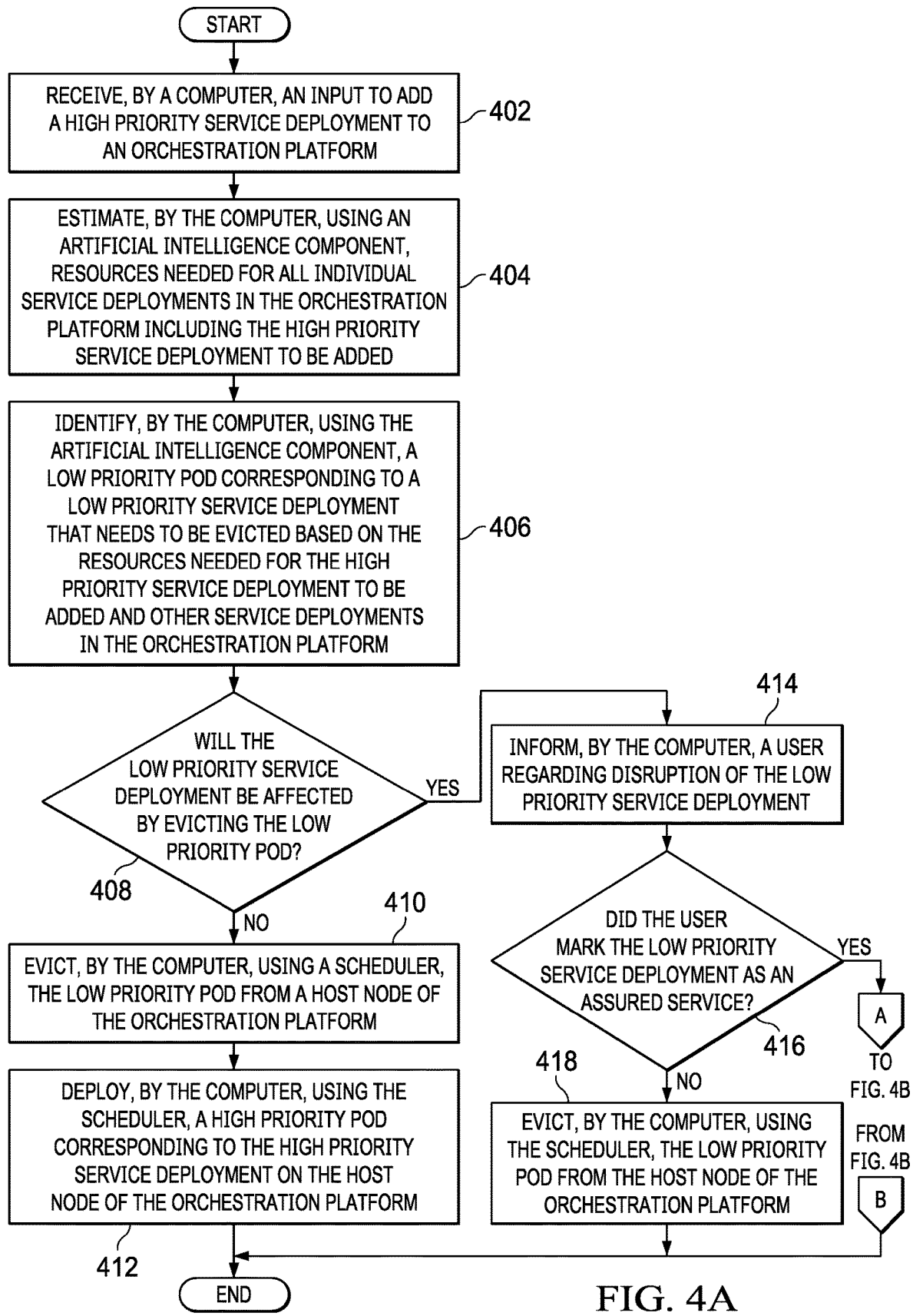
FIGS. 4A-4B are a flowchart illustrating a process for selecting a low priority pod for a guaranteed run in accordance with an illustrative embodiment.
Figure 4B:
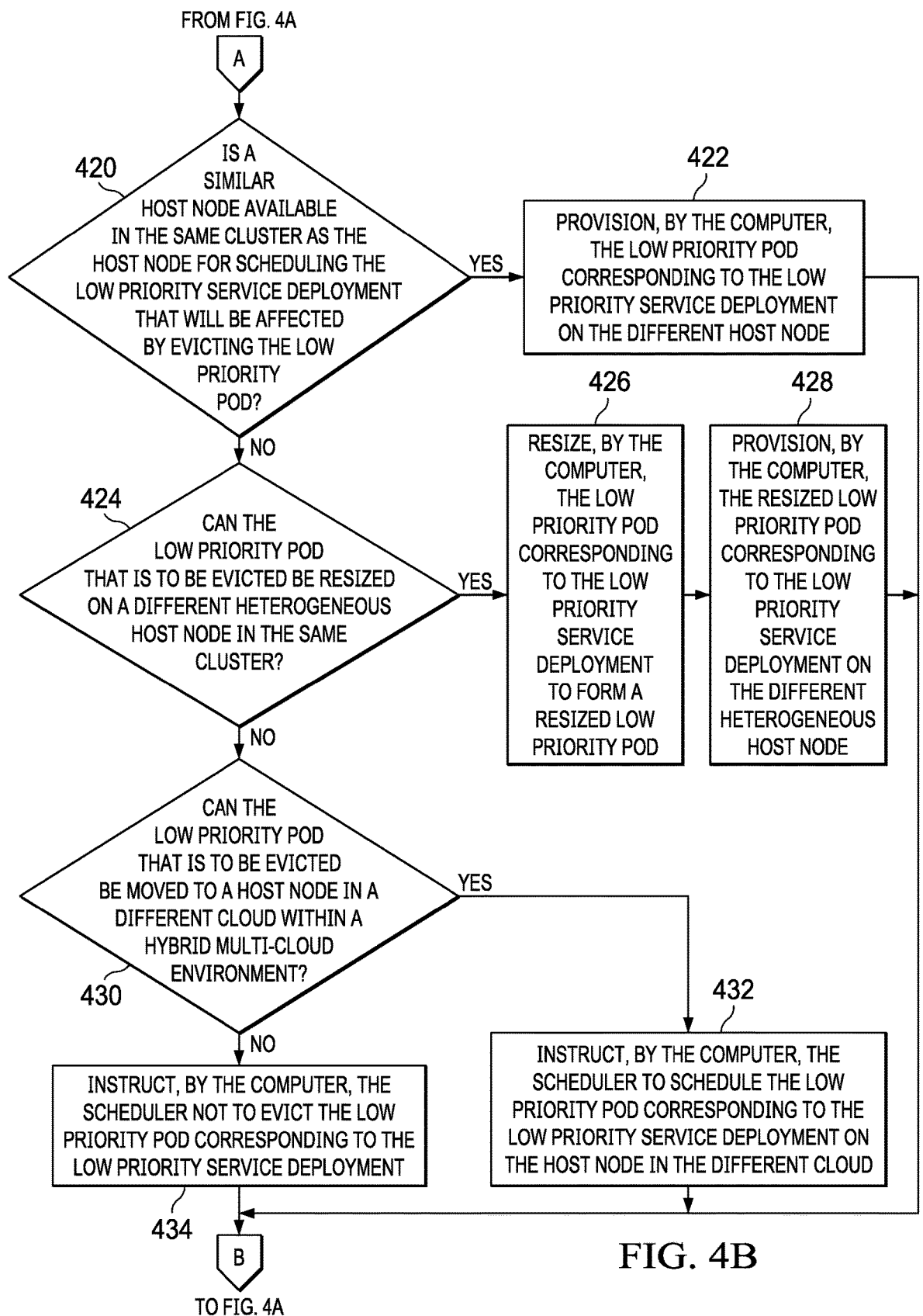

With reference now to FIGS. 4A-4B, a flowchart illustrating a process for selecting a low priority pod for a guaranteed run is shown in accordance with an illustrative embodiment. The process shown in FIGS. 4A-4B may be implemented in a computer, such as, for example, controller node 104 in FIG. 1 or data processing system 200 in FIG. 2. For example, the process shown in FIGS. 4A-4B may be implemented in service assurance manager 218 in FIG. 2.

The process begins when the computer receives an input to add a high priority service deployment to an orchestration platform (step 402). The orchestration platform may be, for example, network data processing system 100 in FIG. 1 or service assurance system 300 in FIG. 3. In response to the computer receiving the input to add the high priority service deployment to the orchestration platform, the computer, using an artificial intelligence component, estimates resources needed for all individual service deployments in the orchestration platform including the high priority service deployment to be added (step 404). The artificial intelligence component may be, for example, artificial intelligence component 308 in FIG. 3.

The computer, using the artificial intelligence component, identifies a low priority pod corresponding to a low priority service deployment that needs to be evicted based on the resources needed for the high priority service deployment to be added and other service deployments in the orchestration platform (step 406). In addition, the computer makes a determination as to whether the low priority service deployment will be affected by evicting the low priority pod (step 408).

If the computer determines that the low priority service deployment will not be affected by evicting the low priority pod, no output of step 408, then the computer, using a scheduler, evicts the low priority pod from a host node of the orchestration platform (step 410). The scheduler may be, for example, scheduler 312 in FIG. 3. Further, the computer, using the scheduler, deploys a high priority pod corresponding to the high priority service deployment on the host node of the orchestration platform (step 412).

Returning again to step 408, if the computer determines that the low priority service deployment will be affected by evicting the low priority pod, yes output of step 408, then the computer informs a user regarding disruption of the low priority service deployment (step 414). Afterward, the computer makes a determination as to whether the user marked the low priority service deployment as an assured service (step 416).

If the computer determines that the user did not mark the low priority service deployment as an assured service, no output of step 416, then the computer, using the scheduler, evicts the low priority pod from the host node of the orchestration platform (step 418). Thereafter the process terminates. If the computer determines that the user did mark the low priority service deployment as an assured service, yes output of step 416, then the computer makes a determination as to whether a similar host node is available in the same cluster as the host node for scheduling the low priority service deployment that will be affected by evicting the low priority pod (step 420).

If the computer determines that a similar host node is available in the same cluster as the host node for scheduling the low priority service deployment that will be affected by evicting the low priority pod, yes output of step 420, then the computer provisions the low priority pod corresponding to the low priority service deployment on the different host node (step 422). Thereafter, the process terminates. If the computer determines that a similar host node is not available in the same cluster as the host node for scheduling the low priority service deployment that will be affected by evicting the low priority pod, no output of step 420, then the computer makes a determination as to whether the low priority pod that is to be evicted can be resized (e.g., reduced in size) on a different heterogeneous host node in the same cluster (step 424).

If the computer determines that the low priority pod that is to be evicted can be resized on a different heterogeneous host node in the same cluster, yes output of step 424, then the computer resizes the low priority pod corresponding to the low priority service deployment to form a resized low priority pod (step 426). Further, the computer provisions the resized low priority pod corresponding to the low priority service deployment on the different heterogeneous host node (step 428). Thereafter, the process terminates.

Returning again to step 424, if the computer determines that the low priority pod that is to be evicted cannot be resized on a different heterogeneous host node in the same cluster, no output of step 424, then the computer makes a determination as to whether the low priority pod that is to be evicted can be moved to a different cloud in a hybrid multi-cloud environment (step 430). If the computer determines that the low priority pod that is to be evicted can be moved to a different cloud in a hybrid multi-cloud environment, yes output of step 430, then the computer instructs the scheduler to schedule the low priority pod corresponding to the low priority service deployment on the different cloud in the hybrid multi-cloud environment (step 432). Thereafter, the process terminates. If the computer determines that the low priority pod that is to be evicted cannot be moved to a different cloud in a hybrid multi-cloud environment, no output of step 430, then the computer instructs the scheduler not to evict the low priority pod corresponding to the low priority service deployment (step 434). Thereafter, the process terminates.

Figure 5:
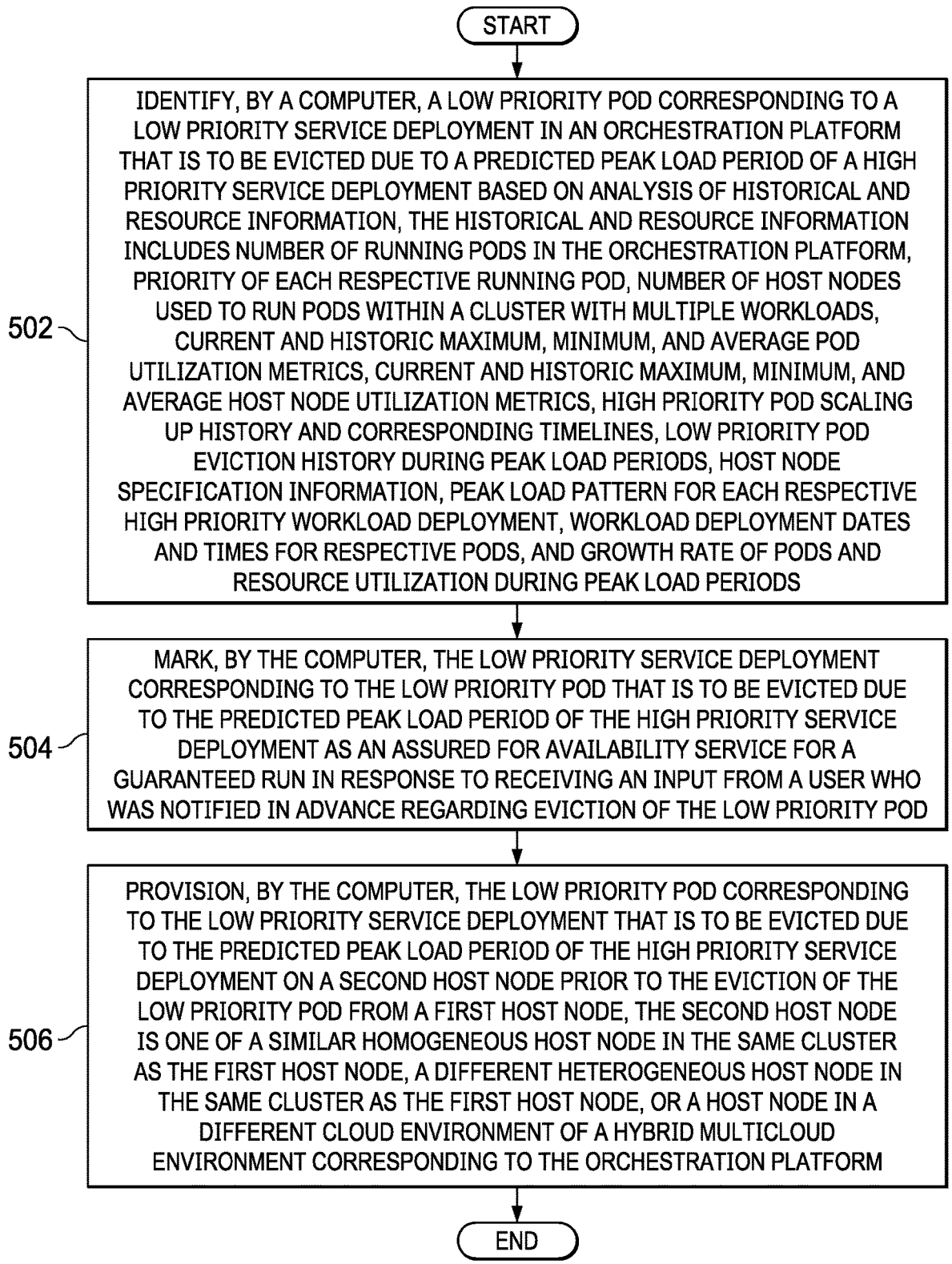
FIG. 5 is a flowchart illustrating a process for provisioning a low priority pod, which is to be evicted from a first host node, on a second host node in accordance with an illustrative embodiment.

With reference now to FIG. 5, a flowchart illustrating a process for provisioning a low priority pod, which is to be evicted from a first host node, on a second host node is shown in accordance with an illustrative embodiment. The process shown in FIG. 5 may be implemented in a computer, such as, for example, controller node 104 in FIG. 1 or data processing system 200 in FIG. 2. For example, the process shown in FIG. 5 may be implemented in service assurance manager 218 in FIG. 2.

The process begins when the computer identifies a low priority pod corresponding to a low priority service deployment in an orchestration platform that is to be evicted due to a predicted peak load period of a high priority service deployment based on analysis of historical and resource information (step 502). The historical and resource information includes, for example, at least one of number of running pods in the orchestration platform, priority of each respective running pod, number of host nodes used to run pods within a cluster with multiple workloads, current and historic maximum, minimum, and average pod utilization metrics, current and historic maximum, minimum, and average host node utilization metrics, high priority pod scaling up history and corresponding timelines, low priority pod eviction history during peak load periods, host node specification information, peak load pattern for each respective high priority workload deployment, workload deployment dates and times for respective pods, or growth rate of pods and resource utilization during peak load periods.

The computer marks the low priority service deployment corresponding to the low priority pod that is to be evicted due to the predicted peak load period of the high priority service deployment as an assured for availability service for a guaranteed run in response to receiving an input from a user who was notified in advance by the computer regarding eviction of the low priority pod (step 504). The computer provisions the low priority pod corresponding to the low priority service deployment that is to be evicted due to the predicted peak load period of the high priority service deployment on a second host node prior to the eviction of the low priority pod from a first host node (step 506). The second host node is one of a similar homogeneous host node in the same cluster as the first host node, a different heterogeneous host node in the same cluster as the first host node, or a host node in a different cloud environment of a hybrid multi-cloud environment corresponding to the orchestration platform. Thereafter, the process terminates.

Thus, illustrative embodiments of the present invention provide a computer-implemented method, computer system, and computer program product for selecting low priority pods corresponding to low priority workload deployments for guaranteed runs in an orchestration platform during peak load periods of high priority workload deployments. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for service assurance, the computer-implemented method comprising:
    identifying, by a computer, a low priority pod corresponding to a low priority service in an orchestration platform that is to be evicted due to a predicted peak load period of a high priority service based on analysis of historical and resource information;
    informing, by the computer, a user regarding disruption of the low priority service based on the eviction of the low priority pod in response to determining that the low priority service will be affected by evicting the low priority pod;
    marking, by the computer, the low priority service corresponding to the low priority pod that is to be evicted due to the predicted peak load period of the high priority service as an assured service for a guaranteed run in response to receiving an input from a user who was notified regarding eviction of the low priority pod;
    determining, by the computer, whether the user marked the low priority service as an assured service;
    provisioning, by the computer, the low priority pod corresponding to the low priority service that is to be evicted due to the predicted peak load period of the high priority service on a second host node prior to the eviction of the low priority pod from a first host node; and
    evicting, by the computer, using a scheduler, the low priority pod from the first host node of the orchestration platform in response to determining that the user did not mark the low priority service as an assured service.

2. The computer-implemented method of claim 1 further comprising:
    receiving, by the computer, an input to add the high priority service to the orchestration platform; and
    estimating, by the computer, using an artificial intelligence component, resources needed for services in the orchestration platform including the high priority service to be added in response to receiving the input to add the high priority service to the orchestration platform.

3. The computer-implemented method of claim 2 further comprising:
    identifying, by the computer, using the artificial intelligence component, the low priority pod corresponding to the low priority service that needs to be evicted based on the resources needed for the high priority service to be added and the services in the orchestration platform.

4. The computer-implemented method of claim 1 further comprising:
    determining, by the computer, whether the low priority service will be affected by evicting the low priority pod;
    evicting, by the computer, using a scheduler, the low priority pod from the first host node of the orchestration platform in response to determining that the low priority service will not be affected by evicting the low priority pod; and
    deploying, by the computer, using the scheduler, a high priority pod corresponding to the high priority service on the first host node of the orchestration platform.

5. The computer-implemented method of claim 1 further comprising:
    determining, by the computer, whether a similar host node is available in a same cluster as the first host node for scheduling the low priority service that will be affected by evicting the low priority pod in response to determining that the user did mark the low priority service as an assured service, wherein the similar host node is the second host node; and
    provisioning, by the computer, the low priority pod corresponding to the low priority service on the second host node in the same cluster as the first host node in response to determining that the second host node is available in the same cluster as the first host node for scheduling the low priority service that will be affected by evicting the low priority pod.

6. The computer-implemented method of claim 1 further comprising:
    determining, by the computer, whether the low priority pod that is to be evicted can be resized on a heterogeneous host node in a same cluster as the first host node in response to determining that a similar host node is not available in the same cluster as the first host node for scheduling the low priority service that will be affected by evicting the low priority pod, wherein the heterogeneous host node is the second host node;
    resizing, by the computer, the low priority pod corresponding to the low priority service to form a resized low priority pod in response to determining that the low priority pod that is to be evicted can be resized on the second host node in the same cluster; and
    provisioning, by the computer, the resized low priority pod corresponding to the low priority service on the second host node in the same cluster.

7. The computer-implemented method of claim 1 further comprising:
    determining, by the computer, whether the low priority pod that is to be evicted can be moved to a host node in a different cloud in a hybrid multi-cloud environment in response to determining that the low priority pod that is to be evicted cannot be resized on a heterogeneous host node in a same cluster as the first host node, wherein the host node in the different cloud is the second host node; and instructing, by the computer, a scheduler to schedule the low priority pod corresponding to the low priority service on the second host node in the different cloud in the hybrid multi-cloud environment.

8. The computer-implemented method of claim 1, wherein the historical and resource information includes at least one of number of running pods in the orchestration platform, priority of each respective running pod, number of host nodes used to run pods within a cluster with multiple workloads, current and historic maximum, minimum, and average pod utilization metrics, current and historic maximum, minimum, and average host node utilization metrics, high priority pod scaling up history and corresponding timelines, low priority pod eviction history during peak load periods, host node specification information, peak load pattern for each respective high priority workload deployment, workload deployment dates and times for respective pods, or growth rate of pods and resource utilization during peak load periods.

9. A computer system for service assurance, the computer system comprising:

a bus system;

a storage device connected to the bus system, wherein the storage device stores program instructions; and a processor connected to the bus system, wherein the processor executes the program instructions to:

identify a low priority pod corresponding to a low priority service in an orchestration platform that is to be evicted due to a predicted peak load period of a high priority service based on analysis of historical and resource information;

inform a user regarding disruption of the low priority service based on the eviction of the low priority pod in response to determining that the low priority service will be affected by evicting the low priority pod;

mark the low priority service corresponding to the low priority pod that is to be evicted due to the predicted peak load period of the high priority service as an assured service for a guaranteed run in response to receiving an input from a user who was notified regarding eviction of the low priority pod;

determine whether the user marked the low priority service as an assured service;

provision the low priority pod corresponding to the low priority service that is to be evicted due to the predicted peak load period of the high priority service on a second host node prior to the eviction of the low priority pod from a first host node; and evict using a scheduler, the low priority pod from the first host node of the orchestration platform in response to determining that the user did not mark the low priority service as an assured service.

10. The computer system of claim 9, wherein the processor further executes the program instructions to:

receive an input to add the high priority service to the orchestration platform; and estimate, using an artificial intelligence component, resources needed for services in the orchestration platform including the high priority service to be added in response to receiving the input to add the high priority service to the orchestration platform.

11. The computer system of claim 10, wherein the processor further executes the program instructions to:

identify, using the artificial intelligence component, the low priority pod corresponding to the low priority service that needs to be evicted based on the resources needed for the high priority service to be added and the services in the orchestration platform.

12. The computer system of claim 9, wherein the processor further executes the program instructions to:

determine whether the low priority service will be affected by evicting the low priority pod;

evict, using a scheduler, the low priority pod from the first host node of the orchestration platform in response to determining that the low priority service will not be affected by evicting the low priority pod; and deploy, using the scheduler, a high priority pod corresponding to the high priority service on the first host node of the orchestration platform.

13. A computer program product for service assurance, the computer program product comprising a computer-readable storage medium having program instructions embodied therewith, the program instructions executable by a computer to cause the computer to perform a method of:

identifying, by the computer, a low priority pod corresponding to a low priority service in an orchestration platform that is to be evicted due to a predicted peak load period of a high priority service based on analysis of historical and resource information;

informing, by the computer, a user regarding disruption of the low priority service based on the eviction of the low priority pod in response to determining that the low priority service will be affected by evicting the low priority pod;

marking, by the computer, the low priority service corresponding to the low priority pod that is to be evicted due to the predicted peak load period of the high priority service as an assured service for a guaranteed run in response to receiving an input from a user who was notified regarding eviction of the low priority pod;

determining, by the computer, whether the user marked the low priority service as an assured service;

provisioning, by the computer, the low priority pod corresponding to the low priority service that is to be evicted due to the predicted peak load period of the high priority service on a second host node prior to the eviction of the low priority pod from a first host node; and evicting, by the computer, using a scheduler, the low priority pod from the first host node of the orchestration platform in response to determining that the user did not mark the low priority service as an assured service.

14. The computer program product of claim 13 further comprising:

receiving, by the computer, an input to add the high priority service to the orchestration platform; and estimating, by the computer, using an artificial intelligence component, resources needed for services in the orchestration platform including the high priority service to be added in response to receiving the input to add the high priority service to the orchestration platform.

15. The computer program product of claim 14 further comprising:

identifying, by the computer, using the artificial intelligence component, the low priority pod corresponding to the low priority service that needs to be evicted based on the resources needed for the high priority service to be added and the services in the orchestration platform.

16. The computer program product of claim 13 further comprising:
   determining, by the computer, whether the low priority service will be affected by evicting the low priority pod;
   evicting, by the computer, using a scheduler, the low priority pod from the first host node of the orchestration platform in response to determining that the low priority service will not be affected by evicting the low priority pod; and
   deploying, by the computer, using the scheduler, a high priority pod corresponding to the high priority service on the first host node of the orchestration platform.

17. The computer program product of claim 13 further comprising:
   determining, by the computer, whether a similar host node is available in a same cluster as the first host node for scheduling the low priority service that will be affected by evicting the low priority pod in response to determining that the user did mark the low priority service as an assured service, wherein the similar host node is the second host node; and
   provisioning, by the computer, the low priority pod corresponding to the low priority service on the second host node in the same cluster as the first host node in response to determining that the second host node is available in the same cluster as the first host node for scheduling the low priority service that will be affected by evicting the low priority pod.

18. The computer program product of claim 13 further comprising:
   determining, by the computer, whether the low priority pod that is to be evicted can be resized on a heterogeneous host node in a same cluster as the first host node in response to determining that a similar host node is not available in the same cluster as the first host node for scheduling the low priority service that will be affected by evicting the low priority pod, wherein the heterogeneous host node is the second host node;
   resizing, by the computer, the low priority pod corresponding to the low priority service to form a resized low priority pod in response to determining that the low priority pod that is to be evicted can be resized on the second host node in the same cluster; and
   provisioning, by the computer, the resized low priority pod corresponding to the low priority service on the second host node in the same cluster.

* * * * *